Nov. 27, 1945. N. J. ULFSBY ET AL 2,390,015
AUTOMATIC ANTISLAM CHECK VALVE
Filed May 24, 1943 3 Sheets-Sheet 1

INVENTORS.
NELS J. ULFSBY
ADOLPH C. JENSEN
By Richard J. Jacker
Atty.

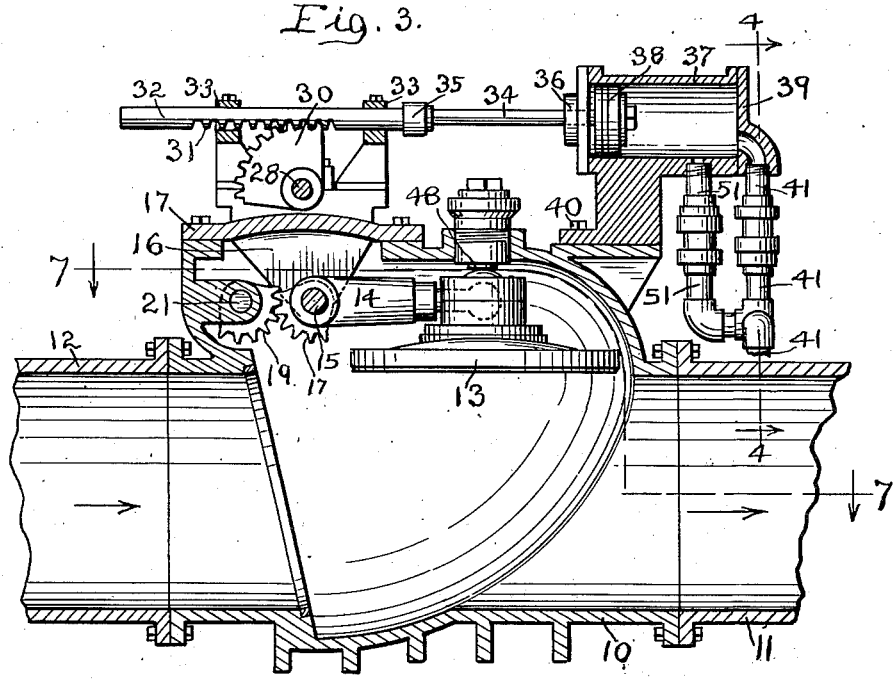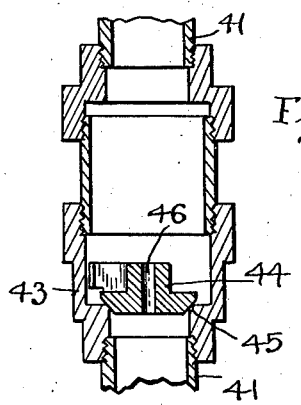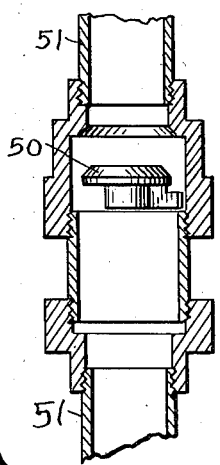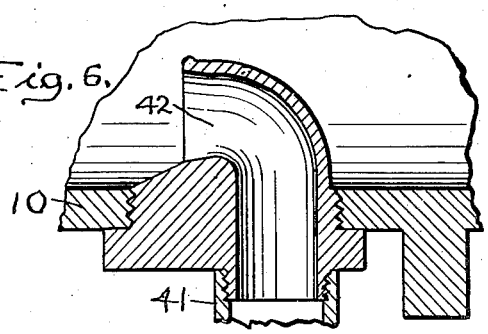

Nov. 27, 1945.   N. J. ULFSBY ET AL   2,390,015
AUTOMATIC ANTISLAM CHECK VALVE
Filed May 24, 1943                3 Sheets-Sheet 3

INVENTORS.
NELS J. ULFSBY
ADOLPH C. JENSEN
By Richard J. Jacker
Atty.

Patented Nov. 27, 1945

2,390,015

UNITED STATES PATENT OFFICE 2,390,015

AUTOMATIC ANTISLAM CHECK VALVE

Nels J. Ulfsby and Adolph C. Jensen,
Chicago, Ill.

Application May 24, 1943, Serial No. 488,284

7 Claims. (Cl. 137—153)

This invention relates to automatic anti-slam check valves employed in a line of pipe through which a constant flow of liquid is forced by a suitable pump and its purpose is to automatically close off the flow of liquid reversely through the pipe when for any reason the pump fails to operate as for instance when it is being shut down for repairs. This is especially true in large water mains where a centrifugal pump driven by an electric motor furnishes the water pressure in the water main and when the pump ceases to operate and back pressure in the water main tends to flow backwards through the centrifugal pump and if the same is not checked causes considerable damage and large repair costs.

The objects of this invention are first; to furnish a valve for water mains which is opened and closed automatically with the operation and non-operation of the pump furnishing the pressure in the water main and requires no manual attention; second, to furnish an auxiliary cylinder for moving the valve whose piston is controlled by a Pitot tube in the portion of the water main between the pump and the valve; third, to permit moving the valve to an open position faster than it will move to a closed position; fourth, to have the valve move the greatest distance towards its closed position much faster than its final movement to its closed position; fifth, to provide means for holding the valve in its open position against the force of gravity and against the force which would tend to cause it to move; sixth, to furnish a valve which is moved to its closed position by force of gravity; seventh, to provide a cushion bumper for the valve when it reaches its open position; eighth, to make a construction which is simple to assemble and disassemble and other objects to become apparent from the description to follow.

Figure 1:
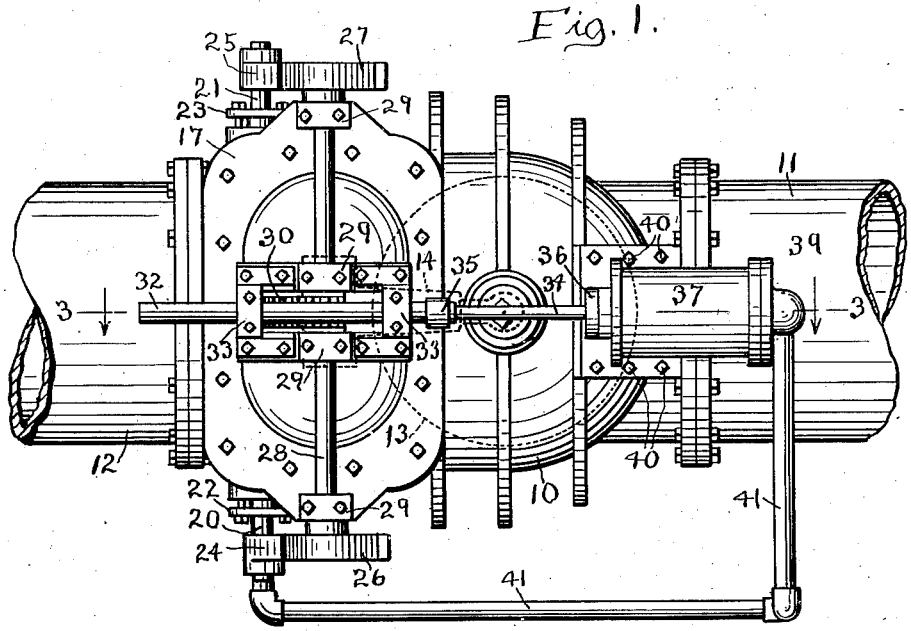
Figure 2:
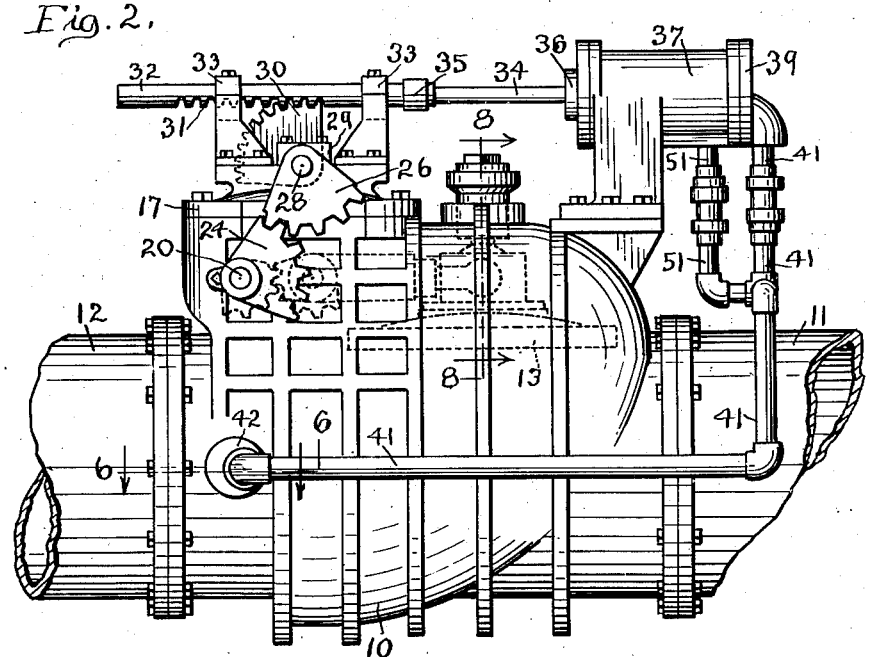
Figure 7:
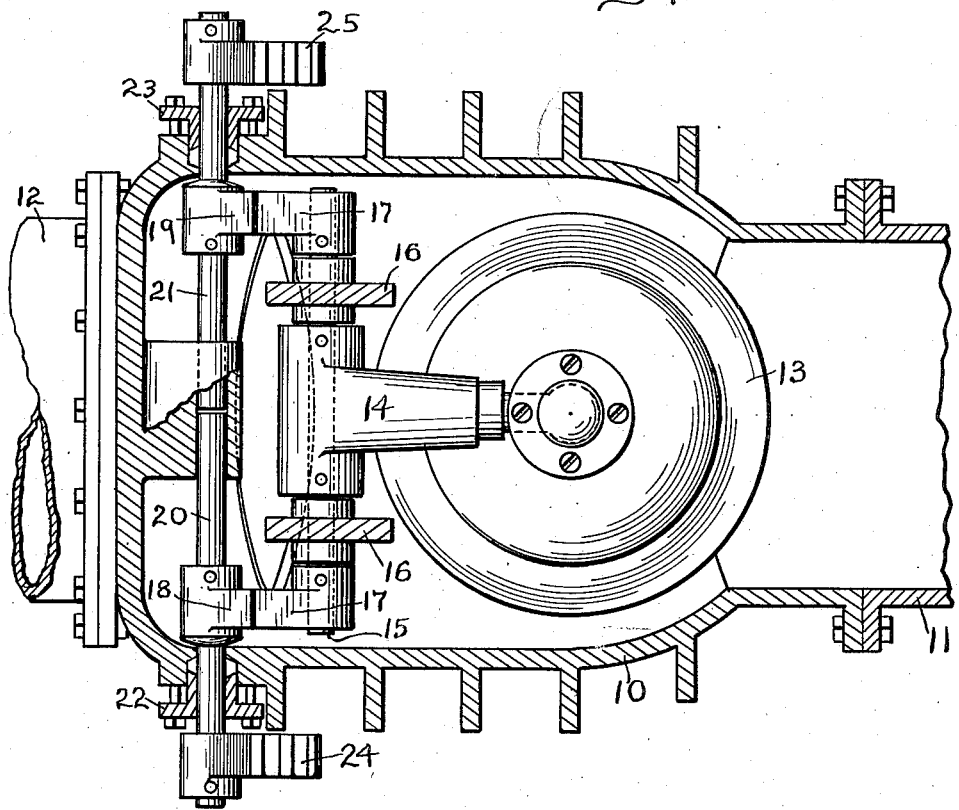
Figure 8:
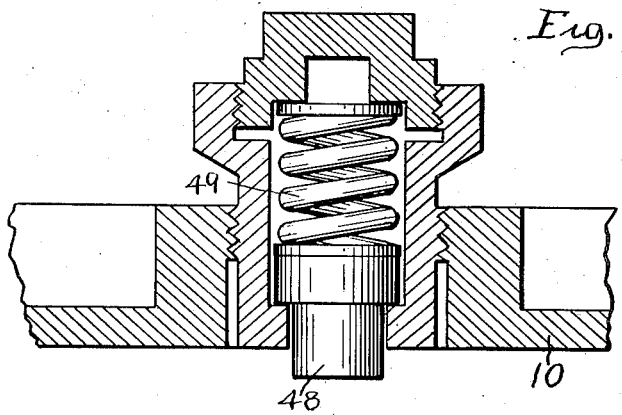

To describe the invention so that others versed in the art to which it pertains can make and use the same it is illustrated on the accompanying three sheets of drawings forming a part of this specification and in which Figure 1 is a plan view of a valve embodying this invention; Fig. 2 is a side elevation of the same; Fig. 3 is a vertical sectional view taken on line 3—3 of Fig. 1, partly in elevation; Fig. 4 is a sectional view taken on line 4—4 of Fig. 3, showing an enlarged view of the valve below the auxiliary cylinder; Fig. 5 is a vertical sectional view on an enlarged scale of another valve below the auxiliary cylinder; Fig. 6 is an enlarged sectional view taken on line 6—6 of Fig. 2, showing the Pitot tube; Fig. 7 is an enlarged sectional view taken on line 7—7 of Fig. 3, and Fig. 8 is an enlarged sectional view taken on line 8—8 of Fig. 2.

Similar reference numerals refer to similar parts throughout the specification and drawings.

The valve casing is shown at 10, the discharge end of the valve casing is connected by pipe 11 to the water main, not shown, and the intake end of the valve casing is connected to the pump, not shown, by the pipe 12. The valve 13 is connected by ball and socket joint to the free end of arm 14 which is rigidly secured to the shaft 15 mounted to freely rotate in suitable bearings provided on the lower ends of the extensions 16 depending from the cover plate 17 which is securely bolted to the open upper end of the valve casing 10 and serving as a water tight seal for said opening. Rigidly secured to the shaft 15 are the two segmental gears 17, 17 which are in mesh with the two segmental gears 18 and 19 which are rigidly secured to the two concentric shafts 20 and 21 respectively which are mounted to rotate freely in bearings rigid with the valve casing 10. The adjacent ends of the shafts 20 and 21 are practically contacting but the shafts are made independent of one another so that any variation in the teeth of the segmental gears may be corrected by each shaft turning as required. The outer ends of the shafts 20 and 21 extend through suitable stuffing boxes 22 and 23 to the exterior of the valve casing 10 where they have rigidly secured to same the segmental gears 24 and 25 respectively. The segmental gear 24 is in constant mesh with the segmental gear 26 and the segmental gear 25 is in constant mesh with the segmental gear 27; and both segmental gears 26 and 27 are rigidly secured to the ends of the shaft 28 which extends crosswise above the cover plate 17 and is mounted to freely rotate in bearings 29, 29 made rigid with the cover plate 17.

A segmental gear 30 is rigidly secured to practically the center of shaft 28 and is in constant mesh with the rack bar 31 formed on the lower side of the sliding bar 32 mounted to freely slide in suitable bearings 33, 33 extending up from and made rigid with the cover plate 17. The one end of the bar 32 is disconnectably attached to one end of the piston rod 34 at 35 so that bar 32 can be detached from the piston rod 34 for the purpose of assembling and disassembling the parts. The piston rod 34 extends through the usual bearing 36 to the interior of the cylinder 37 where it is rigidly secured to the piston 38 and the end of the cylinder opposite the bearing 36 is sealed by the cylinder head 39. The cylinder 37 is rigidly secured to the valve casing 10 by suitable bolts 40. The end of the cylinder 37 nearest the head 39 has a pipe 41 connecting same with the Pitot tube 42 located in the intake end of the valve casing 10 as clearly seen in Fig. 6. In a vertically extending portion of the pipe 41 is located a gravity valve 43 seen in Fig. 4, the plunger 44 of which normally moves down by force of gravity and rests on the seat 45 in which position the passing of water downwardly will be limited or restricted by the size of the hole 46 provided in the plunger 44. However when the water passes upwardly in pipe 41 the plunger 44 will be lifted off the seat 45 so that a larger volume of water can pass up through pipe 41 than can pass down through pipe 41. Thus it will be noted when valve 13 moves upwardly about its pivot 15 the piston 38 in cylinder 37 will move toward the left as seen in Fig. 3; and when the valve 13 moves downwardly about its pivot 15 the piston 38 will move toward the right as seen in Fig. 3. From the above description it will be understood that the valve 13 will move upward to an open position faster than it will move downward to a closed position.

When the pump, not shown, ceases to operate the flow of water will discontinue through the valve casing 10 in the direction indicated by the arrows in Fig. 3, and the valve 13, because of its great weight, will move downward about its pivot 15 aided by the reverse flow of water through valve casing 10 at a rapid pace but will be retarded because of its positive connection with piston 38 in cylinder 37 which piston can only move to the right as seen in Fig. 3, as fast as water can pass through the hole 46 in plunger 44; this flow of water being slightly augmented by the suction effect of reverse flow of water past the Pitot tube 42. This retarded movement of the valve 13 downward to a closed position will prevent too hard a slam against its seat 47. The valve is thereby protected against damage from slamming against the valve seat. Then when the pump, not shown, is again put in operation and the water flows through pipe 12 in the direction indicated by the arows in Fig. 3, the water will press against the valve 13 in an effort to move it to its open position and the water will also pass into the Pitot tube 42, through pipe 41, lift the plunger 44 off its seat 45 and into the cylinder 37 moving the piston 38 to the left as seen in Fig. 3, thus assisting to move the valve 13 up to an open position about its pivot 15. As the valve 13 reaches its extreme open position it will come to a stop against the bumper 48 held in position by the spring 49. The bumper 48 and spring 49 are suitably secured in proper position in the valve casing 10.

To permit relatively rapid movement of the valve 13 toward its seat 47 during the initial and major portion of its movement in that direction, there is provided a pipe 51 which communicates with the underside of the cylinder 47 through a port 52, and with the pipe 41 below the valve 43 in the latter (see Fig. 3). A gravity valve 50 is arranged in the pipe 50 to prevent the flow of water through said pipe 51 into the cylinder and permit free flow of water from the cylinder 37 through the pipe and the Pitot tube 42 into the inlet end of the valve casing 10. The opening 52 is placed in such a position that the piston 38 will close said opening at a time when the valve 13 nears its closed position, whereupon the remainder or final portion of the movement of the valve 13 to closed position will be retarded as an incident to the restricted flow of water permitted to occur through the small opening 46 in the control valve 43 as already explained. The piston 38 in its movement to the right never passes the opening 52 and thereby serves to maintain the same closed so that water does not reach the piston rod side of the piston except to the extent of any normal leakage which may be expected in a device of this character. Thus leakage of water from the cylinder 37 at the piston rod bearing 36 is maintained at a minimum if not completely avoided.

In actual operation the mechanism above described can be so constructed and adjusted that the most efficient service will be given and the parts will remain intact an indefinite length of time without any attention required to same. As for instance the size of the piston 38 in cylinder 37 can be made larger or smaller, the hole 46 in plunger 44, the plungers 44 and 50 and the pipes 41 and 51 can be made larger or smaller; the Pitot tube 42 can be made larger or smaller and the valve 13 may be made of lighter or heavier material without in the least departing from the scope of the invention.

In operation when the pump, not shown, is put into operation forcing the water in the direction indicated by the arrows in Fig. 3, some of the water will enter the Pitot tube 42 and the greater amount of water will press against the valve 13 tending to move same to an open position but its movement will be somewhat retarded because of its positive movable connection with the piston 38, which in its movement away from the right hand end of cylinder 37 as seen in Fig. 3, can only move as fast as the water can enter the Pitot tube 42 and the cylinder 37; and as the valve 13 approaches its horizontal position the pressure of water against same is reduced but the quantity of water entering the Pitot tube 42 remains the same and will force the valve 13 up against the bumper 48 and will continue pressing the valve 13 against said bumper 48 as long as the water continues to flow into the Pitot tube 42, thus holding the valve 13 up positively and preventing same from swaying up and down on the stream of water.

When the pump, not shown, discontinues operating the water pressure caused by the pump will cease and the back pressure of the water in the pipe 11 will tend to assist the closing of the valve 13 by the force of gravity which will normally tend to move it to a closed position. The valve 50 will be permitted to drop to open position shown in Fig. 5 so as to permit a relatively free flow of water from the cylinder 37 through the pipe 51 and the pipe 41, as already explained, thereby to cause the initial portion of the closing movement of the valve 13 to be fairly fast. However, when the piston 38 covers the opening 52, the flow of water from the cylinder 37 is subjected to the control of the valve 44, which restricts the said flow to effect retarded movement of the valve 13 as already explained. The valve 44 is, of course, forced to its closed position as shown in Fig. 4 by the reversed flow of water and by gravity. The location of the opening 52 may be selected to produce any desired proportion of the initial portion of fast valve closing movement and final, slow valve closing movement, and the size of the valve opening 46 may be selected to produce any desired rate of slow motion of the valve 13 during the final portion of its closing movements.

Having thus fully described the invention what is claimed as new and desired to be secured by Letters Patent of the United States is:

1. A pipe and means for forcing water through the pipe, a valve in the pipe to swing on a pivot, a cylinder and a piston in the cylinder which is moved by water pressure, the piston having connection with said valve to positively move the same therewith, a pipe connecting the closed end of the cylinder with the intake port of the valve to permit free circulation of water between the two, a gravity valve in said pipe provided with a small opening to permit passage of water when the valve is in a closed position, whereby a larger quantity of water will pass upward through said pipe into the cylinder than will pass downward through said pipe out of the cylinder, a second pipe connecting the closed end of the cylinder with the intake port of the first named valve having its connection with the cylinder so arranged that it will be closed when the piston reaches a predetermined position in its movement, and a gravity check valve in said last named pipe arranged to permit water to flow out of said cylinder and prevent water flowing into said cylinder.

2. In combination, a valve casing mounted in a fluid pressure pipe having a removable cover, a valve within said casing, a rotatable shaft having its bearing on the inner side of the cover upon which said valve is rigidly mounted, a segmental gear rigidly mounted on said shaft to open and close the valve, a gear in mesh with said segmental gear having its shaft bearing on said valve casing and the shaft extending through a stuffing box to the exterior of the valve casing, means on the exterior end of said shaft having movable connection with a piston, said piston fitted to move in a cylinder rigid with the valve casing, and a pipe connecting the cylinder with the main fluid pressure pipe provided with a perforated valve whereby liquid will be free to pass into the cylinder and will be restricted in its passage through said pipe coming out of the cylinder thereby controlling the movement of the first named valve when moving to a closed position.

3. In combination, a valve casing connected in a liquid pressure pipe having a removable cover, a valve within said casing rigid with two segmental gears mounted to swing on a pivot on said cover, each of said segmental gears meshing with an independent segmental gear, each of these independent gears being rigidly mounted on its independent shaft, said two independent shafts extending in opposite directions having their bearings rigid with the valve casing and extending through stuffing boxes to the exterior of the valve casing where each shaft has rigidly mounted thereon a segmental gear, each of said last named segmental gears meshing with a co-operating segmental gear, said cooperating gears being rigidly mounted on a shaft having its bearings on the exterior of the valve casing cover, a third segmental gear rigid on said last named shaft meshing with a rack-bar mounted to slide in suitable bearings mounted on the exterior of the cover, a piston rod detachably secured to one end of said rack-bar, a piston secured to the piston rod to close a port when moved a predetermined distance, a first pipe forming a connection between the cylinder and the main liquid pressure pipe having a gravity valve therein provided with a small by-pass hole, a second pipe connected between said port in the cylinder and the main liquid pressure pipe provided with a gravity valve normally open to permit free passage of liquid from the cylinder to the main liquid pressure pipe.

4. The combination set forth in claim 3 wherein there is also a spring bumper for said first named valve when the valve is in an open position.

5. The combination set forth in claim 3 wherein there is also a Pitot tube in said main liquid pressure pipe, said Pitot tube forming the connection between the main liquid pressure pipe and said first pipe.

6. An non-slamming check valve of the class described, comprising a valve casing having a valve arranged to swing on a pivot, a cylinder and a piston in the cylinder which is adapted to be moved by water pressure, the piston being connected with said valve to positively move the same therewith, a pipe connecting the closed end of the cylinder with the intake end of said casing, a control valve in said pipe arranged to permit water to pass freely therethrough into the cylinder and provided with a small opening to permit restricted passage of water out of the cylinder when the control valve is in a closed position, a second pipe connecting the closed end of the cylinder with the intake end of said casing having its connection with the cylinder so arranged that it will be closed when the piston reaches a predetermined position in its movement, and a check valve in said last named pipe arranged to permit water to flow out of said cylinder and to prevent water flowing into said cylinder.

7. A non-slamming check valve of the class described, comprising a valve casing having a valve arranged to swing on a pivot, a cylinder and a piston in the cylinder which is adapted to be moved by water pressure, the piston being connected with said valve to positively move the same therewith, a pipe connecting the closed end of the cylinder with the intake end of said casing, a control valve in said pipe arranged to permit water to pass freely therethrough into the cylinder and provided with a small opening to permit restricted passage of water out of the cylinder when the control valve is in a closed position, and a second pipe connecting the closed end of the cylinder with the intake end of said casing having its connection with the cylinder so arranged that it will be closed when the piston reaches a predetermined position in its valve closing movement prior to the end thereof.

NELS J. ULFSBY.
ADOLPH C. JENSEN.